United States Patent [19]

Shira

[11] Patent Number: 5,669,825

[45] Date of Patent: Sep. 23, 1997

[54] METHOD OF MAKING A GOLF CLUB HEAD AND THE ARTICLE PRODUCED THEREBY

[75] Inventor: Chester S. Shira, San Diego, Calif.

[73] Assignee: Carbite, Inc., San Diego, Calif.

[21] Appl. No.: 384,713

[22] Filed: Feb. 1, 1995

[51] Int. Cl.$^6$ ............................................... A63B 53/04
[52] U.S. Cl. ........................... 473/324; 473/349; 473/409
[58] Field of Search ........................... 273/167 R, 77 R, 273/169, 167 F, 173, 167 J, 167 H, 171, 78, 172, 174, 167 A

[56] References Cited

U.S. PATENT DOCUMENTS

| | | |
|---|---|---|
| 1,543,691 | 6/1925 | Beat . |
| 1,968,092 | 7/1934 | Oldham . |
| 2,846,228 | 8/1958 | Reach . |
| 3,218,072 | 11/1965 | Burr ............................ 273/173 |
| 3,266,805 | 8/1966 | Bulla . |
| 3,578,332 | 5/1971 | Caldwell . |
| 3,689,259 | 9/1972 | Hailey . |
| 3,814,437 | 6/1974 | Winquist ........................ 273/171 |
| 3,845,960 | 11/1974 | Thompson . |
| 3,955,820 | 5/1976 | Cochran et al. . |
| 3,961,796 | 6/1976 | Thompson . |
| 3,970,236 | 7/1976 | Rogers . |
| 3,975,023 | 8/1976 | Inamori ........................ 273/173 |
| 4,022,584 | 5/1977 | Rudy . |
| 4,145,052 | 3/1979 | Janssen et al. . |
| 4,326,326 | 4/1982 | MacDonald . |
| 4,437,800 | 3/1984 | Araki et al. . |
| 4,502,687 | 3/1985 | Kochevar . |
| 4,540,178 | 9/1985 | Johnson et al. . |
| 4,588,551 | 5/1986 | Iijima et al. . |
| 4,667,963 | 5/1987 | Yoneyama . |
| 4,687,205 | 8/1987 | Tominaga et al. . |
| 4,740,345 | 4/1988 | Nagasaki et al. . |
| 4,749,197 | 6/1988 | Orlowski . |
| 4,768,787 | 9/1988 | Shira . |
| 4,793,616 | 12/1988 | Fernandez . |
| 4,798,384 | 1/1989 | Kobayashi . |
| 4,824,116 | 4/1989 | Nagamoto et al. . |
| 4,852,880 | 8/1989 | Kobayashi . |
| 4,923,512 | 5/1990 | Timm et al. . |
| 4,992,236 | 2/1991 | Shira . |
| 5,004,242 | 4/1991 | Iwanaga et al. . |
| 5,016,883 | 5/1991 | Kobayashi ........................ 273/167 R |
| 5,062,638 | 11/1991 | Shira . |
| 5,217,227 | 6/1993 | Shira ........................ 273/169 |
| 5,255,918 | 10/1993 | Anderson ........................ 473/342 |

FOREIGN PATENT DOCUMENTS

| | | |
|---|---|---|
| 63242287 | 10/1988 | Japan . |
| 64002675 | 1/1989 | Japan . |
| 1232651 | 5/1971 | United Kingdom . |
| 2174009 | 10/1986 | United Kingdom . |

*Primary Examiner*—Sebastiano Passaniti
*Attorney, Agent, or Firm*—John L. Gray

[57] ABSTRACT

The invention involves golf club heads and a method of making golf club heads which comprises forming one or more components of the golf club head from sintered metal powders and then joining the components by welding, brazing, or diffusion or adhesive bonding to form a completed golf club head.

16 Claims, 1 Drawing Sheet

METHOD OF MAKING A GOLF CLUB HEAD AND THE ARTICLE PRODUCED THEREBY

BACKGROUND OF THE INVENTION

This invention relates to golf club heads and more particularly to a method of making golf club heads in which one or more components are formed from sintered metal powders and then joined by welding, brazing, or diffusion or adhesive bonding and to golf club heads made by this method.

There are a number of important characteristics which are necessary to provide a good golf club head. Optimally, golf club heads would be made with extended-life ball-striking surfaces, specific sonic characteristics, a high rotational moment of inertia, high friction surfaces, high ductility hosel and other desired mechanical properties, an optimally located center of gravity, selective perimeter or heel, head, and toe weighting, and optimal densities in selected sections.

Currently, these characteristics are achieved with varying degrees of success. Extended-life ball-striking surfaces are presently produced by metal spraying a hard deposit on the surface of cast or forged clubs, and flame or case hardening cast or forged clubs. Additionally, ion implantation techniques may be used to harden a previously roughened surface. This may also be accomplished by the teaching of U.S. Pat. No. 4,768,787, Shira, by producing a composite of hard particles in a softer metal matrix on the surface of the club. Extended-life ball-striking surfaces which are produced by hardening are temporary because of the thin surface developed by conventional techniques. The impact loading of the surface of golf clubs tends to peen and burnish the softer matrix material under the hard surface, destroying the desired roughness of the hardened surface material. Hard surfaces produced by flame spraying or plating a hard material on the surface of the golf club are often thin and quite brittle and tend to flake and peel under various service conditions.

Desired sonic characteristics are produced by selecting an alloy that, when properly heat treated, provides a sound when striking the ball that is deemed by experts to be desirable. The sound most desired is that of a ball striking a soft iron-carbon alloy commonly used for forged club heads. The hardness of this alloy is approximately Rockwell B85, representing a relatively soft, low-strength alloy. Clubs made of alloys with similar hardness levels are easily nicked and damaged by striking rocks and other hard objects, and wear rapidly by abrasion when used in sand traps and loam-type soils.

A high rotational moment of inertia is achieved by placing a low mass of material in the center of the club and a greater mass of material on the periphery.

High friction surfaces are produced by sandblasting, flame spraying, and also by the use of hard particles in a softer metal matrix as is taught in U.S. Pat. No. 4,768,787, Shira.

Desirable properties in selected areas of the club head, such as a high ductility hosel, may be achieved by local heat treatment using current technology. However, no manufacturers are known to be using this technique.

The center of gravity of presently manufactured clubs is adjusted only by changing the shape, size, and location of various portions of the club head or by utilizing suitably positioned weight ports holding appropriate dense materials.

Perimeter weighting and head and toe weighting are commonly used in forged and investment cast clubs. The desired weight distribution is achieved by shaping the club head to create a cavity in the back of the club, producing a complex shape known as cavity backed irons. In some cases, particularly putters, a cavity is provided in back of the club which is later filled with higher density metals by lead casting or gluing in place higher density metals. The resultant cavity is difficult to finish to a smooth surface by grinding and polishing; therefore, the club heads are not generally finished to a high polish. The raw, unfinished look of the cavity back is not attractive or well accepted by many skilled players. However, the improved performance provided by the cavity back and perimeter weighting is recognized as a benefit by players of all skill levels.

Optimal densities in selected sections of club heads are not possible using current forging and casting practices. The only methods of changing density are either to substitute one alloy for another for the entire club head or to utilize one or more weight ports where higher density disks or powders may be positioned and held in place by mechanically fastening or glue-bonding the enclosures in place. Additives of different density alloys to other primary alloys in the casting process may produce a third alloy or a non-compatible mixture of metallic elements not suitable for use as a golf club head.

Golf club heads made according to the teachings of U.S. Pat. Nos. 4,992,236 and 5,062,638, Shira, achieve these desired characteristics, either alone or in combination, by the use of various powder metallurgy processes utilizing high and low density materials, hard materials, and ductile materials for various portions of the club head to create the desired effects. Since the use of the various powder metallurgy processes can be expensive, alternative methods of producing bonds using these techniques were sought.

Therefore, it is an object of the present invention to provide a golf club head using a powder metallurgy process having an alternative bond between the different metals used.

It is another object of the invention to produce a golf club head using a powder metallurgy process which will have the desirable characteristics for the specific application intended.

It is a further object of the invention to provide a method of manufacturing such a golf club head.

These, together with other objects and advantages of the invention will become more readily apparent to those skilled in the art when the following general statements and descriptions are read in the light of the appended drawings.

SUMMARY OF THE INVENTION

The invention involves a method of making golf club heads which comprises forming one or more components of the golf club head from sintered metal powders and then joining the components by welding, brazing, or diffusion or adhesive bonding to form a completed golf club head. One component can have an extension and another component can have a cavity designed to receive the extension. The extensions can be any shape, but are preferably triangles, rectangles, or tapered rectangles. In one embodiment, the cavity is deeper than the extension whereby a chamber is formed in an area between the extension and the cavity.

The invention also involves a golf club head which comprises one or more components made from sintered metal powders, the components being joined by welding, brazing, or diffusion or adhesive bonding. Adhesive bonding can be used alone, or in combination with mechanical fasteners. A golf club head can be made according to this invention in which the first component is made of a heavy material and the second component is made of a light, low density material. The heavy material can be tungsten or a tungsten-rich alloy, and the light, low density material can be titanium or an alloy of titanium.

DETAILED DESCRIPTION OF THE INVENTION

In making a golf club head according to the present invention, the golf club head is divided into different components. This division may be based on different desirable properties for each component. For example, in a putter it is desirable that the heel and toe be made of a more dense material than the center to reduce twisting or rotation of the putter if a ball is hit off center. The center of the putter is desirably made from a corrosion resistant material.

When the club head has been divided into components, molds must be made for each component. The molds may be made either of a hard metallic material or of rubber or similar elastomeric materials. They may be either disposable or reusable.

At least one of the components of the golf club head must be made using powder metallurgy technology or methods. U.S. Pat. No. 4,992,236, Shira, describes several such potential methods. All of the components could be made using these methods. Other processes could also be used for some components, such as making a component from wrought or cast metal.

Figure 1:
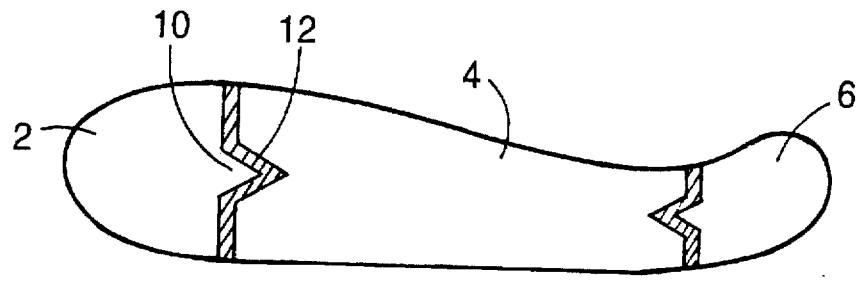
FIG. 1 is a front view of a golf club putter which has been perimeter weighted to achieve maximum desirable characteristics.

When the components of the golf club head have been prepared, the club head is ready for assembly. FIG. 1 shows the invention used in the manufacture of a putter. The same method applies no matter which type of golf club head is being made.

In FIG. 1, the putter 1 is made of three components, a toe 2, a middle portion 4, and a heel 6. The toe 2 and the heel 6 are preferably made of a more dense material than the middle portion 4, such as a tungsten-rich alloy. The middle portion 4 is preferably made of a light-weight corrosion resistant metal, such as titanium.

The toe 2 has an extension 10 which protrudes from one end. Middle portion 4 has a cavity 12 designed to receive extension 10. The components of the golf club head are fitted together, then joined by welding, brazing, or diffusion or adhesive bonding.

When welding is the selected process used to join components of these golf clubs, the optimum processes are often dependent on the materials and thicknesses being jointed. For example, when welding titanium to tungsten it is necessary to direct the thermal energy to the titanium component to avoid melting of the tungsten which will create a very crack sensitive alloy in the resulting weld metal. To avoid this problem, high energy density processes such as electron and laser beam welding perform best since the total energy can be directed to the titanium component causing only the titanium to melt and weld-bond to the tungsten component. These processes are useful on thicknesses as great as 1½ inch. Friction and inertia welding are also useful for this combination of metals and may be used on all potential thickness combinations envisioned. Where complex joint configurations make the use of these processes difficult, then brazing, diffusion bonding and adhesive bonding are the processes of choice. Processes used to weld titanium to other common structural metals and alloys such as steel, stainless steel, and copper based alloys would be similar to those utilized to weld or join titanium to tungsten.

Gas Tungsten Inert Arc Welding (GTAW) may be used on combinations of compatible metals such as steel to stainless steel, titanium to titanium, and copper to brass or bronze. The greater compatibility of these metal combinations avoids the weld cracking described above, and thus, permits use of the broader energy pattern of lower cost electric arc welding processes such as GTAW. While the processes mentioned above will also work on these more compatible combinations of alloys, the economics offered by each process will determine selection of the optimum process.

When using low melting temperature alloys (for example aluminum and magnesium) in combination with high melting temperature alloys (for example steels, titanium, and tungsten) then adhesive bonding and mechanical fasteners join with electron beam and laser beam welding brazing as the processes of choice.

Figure 2:
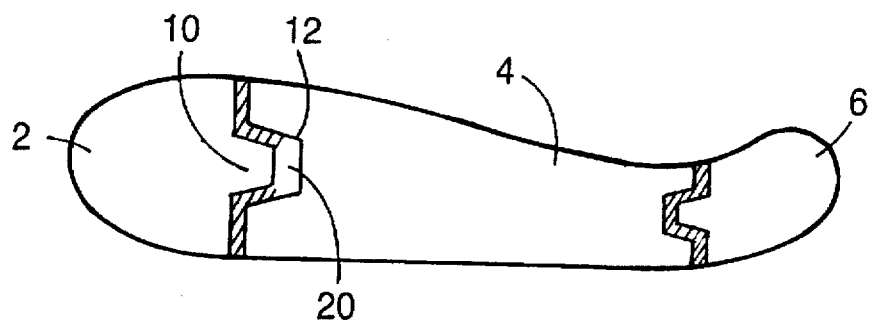
FIG. 2 is a front view of a golf club putter showing an alternative embodiment of the joint between the components.

FIG. 2 shows an alternative joint. In FIG. 2, the extension 10 is shaped like a tapered rectangle. The cavity 12 in the middle portion 6 is deeper than the extension 10, forming a chamber 20. The chamber 20 may be filled, either partially or completely, with a brazing alloy. If the chamber 20 is only partially filled with a brazing alloy, then part of the chamber would remain empty, causing the club head to be slightly lighter in that area than it would have been if the chamber 20 was either completely filled with brazing alloy or did not exist.

The purpose of the extension 10 and cavity 12 is to aid in alignment prior to joining and to provide a stronger joint between the components. The extension 10 may be in the shape of triangle or a tapered rectangle. Other shaped extensions, including but not limited to a saw-tooth or a half-circle, would also work. The shaped extensions shown in FIGS. 1 and 2 may also be simplified or modified. In addition, the extension and cavity may be completely eliminated, and a square butt joint used. The square butt joint is preferred when using fusion welding processes, such as laser and electron beam.

While FIGS. 1 and 2 show the extension 10 on the toe 2 and the cavity 12 in the middle portion 4, these could be reversed without affecting the scope of the invention.

Figure 3:
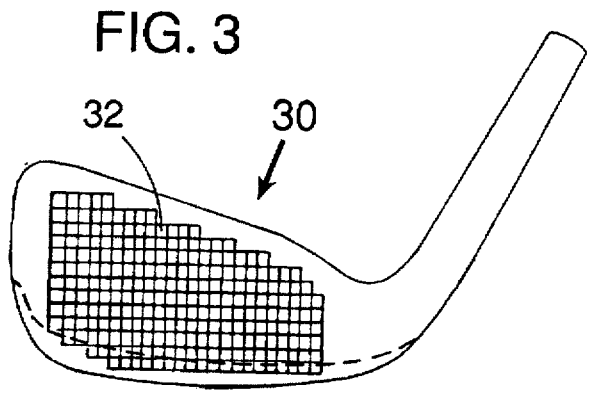
FIG. 3 is a front view of an iron.

FIG. 3 shows a golf club iron 30 made according to the present invention. The face 32 of the iron 30 is preferably made from a light-weight, corrosion resistant material, such as titanium or an alloy of titanium.

Figure 4:
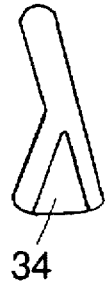
FIG. 4 is a side view of the iron in FIG. 3.

In FIG. 4, an insert (or keel section) 34 can be seen within sole and toe of the iron 30. The insert 34 is preferably made from a heavy material, such as tungsten or an alloy of tungsten.

When a golf club head, such as is shown in FIGS. 3 and 4, is made, preferably no extension is used in joining the components. A simple close-fitting butt joint is preferred for joining the components in this case.

The components of the club head could be joined using filler metals and their alloys, or diffusion enhancing agents, such as silver and other precious metals, nickel, manganese, titanium, cobalt, and copper. The filler metals can be in the form of powder, shim, or wire, or they can be plated on the abutting surfaces.

While a preferred form of the invention has been shown in the drawings and described, since variations in the preferred form will be apparent to those skilled in the art, the invention should not be construed as limited to the specific form shown and described, but instead is as set forth in the following claims.

What is claimed:

1. A method of making a golf club head which comprises joining together adjacent heavier and lighter metallic load bearing components of said golf club head by welding, brazing, or diffusion or adhesive bonding to form a completed golf club head, at least one of said metallic load bearing components having been previously formed from sintered metal powders, and at least one of said heavier metallic load bearing components being located at one of the extremities of said golf club head.

2. The method of claim 1 wherein a first component has an extension and a second component has a cavity designed to receive the extension.

3. The method of claim 2 wherein the extension is in the shape of a triangle.

4. The method of claim 2 wherein the extension is in the shape of a rectangle.

5. The method of claim 4 wherein the rectangle has tapering sides.

6. The method of claim 2 wherein the cavity is deeper than the extension whereby a chamber is formed in an area between the extension and the cavity.

7. A golf club head which comprises at least two adjacent metallic load bearing components, one of said metallic load bearing components being heavier than the other metallic load bearing component, said metallic load bearing components having been joined together by welding, brazing, or diffusion or adhesive bonding, at least one of said metallic load bearing components having been previously formed from sintered metal powders prior to being joined to said other metallic component, said heavier metallic load bearing component being located at one of the extremities of said golf club head.

8. The golf club head of claim 7 wherein a first component has an extension, and a second component has a cavity designed to receive the extension.

9. The golf club head of claim 8 wherein the extension is in the shape of a triangle.

10. The golf club head of claim 8 wherein the extension is in the shape of a rectangle.

11. The golf club head of claim 10 wherein the rectangle has tapering sides.

12. The golf club head of claim 8 wherein the cavity is deeper than the extension whereby a chamber is formed in an area between the extension and the cavity.

13. The golf club head of claim 8 wherein the first component is made of a heavy alloy and the second component is made of a corrosion resistant material.

14. The golf club head of claim 8 wherein the first component is made of a corrosion resistant material and the second component is made of a heavy alloy.

15. The golf club head of claim 13 wherein the heavy alloy is a tungsten-rich alloy and the corrosion resistant material is titanium.

16. The golf club head of claim 14 wherein the heavy alloy is a tungsten-rich alloy and the corrosion resistant material is titanium.

* * * * *